United States Patent [19]

Martin et al.

[11] Patent Number: 4,464,955
[45] Date of Patent: Aug. 14, 1984

[54] CONTROL ARRANGEMENT FOR AN AUTOMATIC CHANGE-SPEED TRANSMISSION SERIES-CONNECTED WITH OUTPUT OF DRIVING ENGINE

[75] Inventors: Klaus Martin, Obertshausen; Gunter Jürgens, Waiblingen; Hermann Gaus, Stuttgart, all of Fed. Rep. of Germany

[73] Assignee: Daimler-Benz Aktiengesellschaft, Fed. Rep. of Germany

[21] Appl. No.: 174,492

[22] Filed: Aug. 1, 1980

[30] Foreign Application Priority Data

Aug. 1, 1979 [DE] Fed. Rep. of Germany ....... 2931285

[51] Int. Cl.$^3$ ............................................. B60K 41/10
[52] U.S. Cl. ...................................... 74/867; 74/877; 74/843
[58] Field of Search ................. 74/865, 863, 867, 877, 74/859, 860, 861, 857, 856, 843

[56] References Cited

U.S. PATENT DOCUMENTS

| | | | |
|---|---|---|---|
| 2,238,746 | 4/1941 | Neracher | 74/877 |
| 2,929,267 | 3/1960 | Wilson | 74/877 |
| 2,997,144 | 8/1961 | Gsching | 74/865 |
| 3,076,353 | 2/1963 | Gsching | 74/865 |
| 3,500,705 | 3/1970 | Forster | 74/863 |
| 3,895,547 | 7/1975 | Murakami | 74/867 |
| 3,949,627 | 4/1976 | Murakami | 74/867 |
| 3,952,614 | 4/1976 | Iijima | 74/865 |
| 4,257,441 | 3/1981 | Iwanaga | 74/867 |
| 4,313,353 | 2/1982 | Honig | 74/867 |

FOREIGN PATENT DOCUMENTS 675229  7/1952  United Kingdom .................. 74/877

Primary Examiner—Allan D. Herrmann
Assistant Examiner—Joseph M. Rolnicki
Attorney, Agent, or Firm—Craig & Burns

[57] ABSTRACT

A control arrangement for an automatic change-speed transmission which is series-connected with an output of a driving engine. A gearshift control slide valve, a manually operable range selection control slide valve, and a gear-holding control slide valve operating in dependence upon a modulating control pressure related to the torque of the driving engine are connected in such a manner that the gearshift control slide valve is held in a position for a higher gear if the driving engine is in an idling position and the range selection control slide valve is in a position for a forward gear range. A downshift control member, operable by a control linkage of a power control of the driving engine affects the modulating pressure to be made effective at the gear-holding control slide valve in such a manner that, upon operating the control linkage from an idling position, the gear-holding control slide valve and gearshift control slide valve are brought into their positions for the lowest gear. A pressure regulating valve adjusts a vacuum pressure effective on a modulating pressure control slide valve in dependence upon positions of the control linkage, and the downshift control member affects the vacuum pressure to be brought to bear on the modulating pressure control slide valve.

6 Claims, 4 Drawing Figures

CONTROL ARRANGEMENT FOR AN AUTOMATIC CHANGE-SPEED TRANSMISSION SERIES-CONNECTED WITH OUTPUT OF DRIVING ENGINE

The present invention relates to a control arrangement and, more particularly, to a control arrangement for an automatic change-speed transmission which is series connected with an output of a driving engine.

In automatic change-speed transmissions, it has been proposed to provide a gear shift control slide valve for a gear change between the lowest and adjacent higher gear, a manually operable range selection control slide valve, and a gear-holding control slide valve operating in dependence upon a modulating control pressure related to the torque of the driving engine. These elements are connected together in such a manner that the gear shift control slide valve is held in its position for the higher gear if the driving engine is in the idling position and the range selection control valve is in a position for a forward gear range. A downshift control member is operable by a control linkage of the power control of the driving engine so as to affect the modulating pressure to be made effective at the gear-holding control slide valve in such a way that, upon operating the control linkage from the idling position, the gear-holding control slide valve and thus perforce also the gearshift control slide valve are brought into their positions for the lowest gear. A pressure regulating valve is provided which adjusts a vacuum pressure to be made effective on the modulating pressure control slide valve setting the modulating control pressure in dependence upon the positions of the control linkage.

In a conventional control arrangement of this type described, for example, in a "Funktionsbeschreibung Automatische MB-Getriebe" (Functional Description of Automatic MB Transmissions), Daimer-Benz AG, flyer no. KD 00 100 12 05 00, May 1975, at pages 43 and 44, the downshift control element is integrated into a control slide valve operated by a gas pedal through a control pressure linkage for a control pressure dependent upon the positions of the gas pedal or accelerator. In this arrangement, a throttle is inserted into the modulating control pressure line connecting the gear-holding control slide valve with the modulating pressure control slide valve, and the control section connected to the gear-holding control slide valve is connected to the regulating slide valve. In an idling position of the accelerator, the regulating slide valve relieves this line section toward zero whereby the gear-holding control slide valve is brought into its position for the higher gear. In this position, the gear-holding control slide valve connects a control pressure to the gearshift control slide valve whereby the latter is likewise brought into its position for the higher gear and releases the operating pressure for the shifting servo element participating in producing the higher gear. During an operation of the accelerator from the idling position, the regulating slide valve blocks the zero connection with respect to the line section connected to the gear-holding control slide valve, so that a modulating control pressure can be built up in this line section downstream of the throttle, which pressure brings the gear-holding control slide valve into its position for the lowest gear. In this position, the gear-holding control slide valve disconnects the control pressure from the gearshift control valve, whereby the latter likewise passes over in its position for the lowest gear and relieves the shifting servo element from the operating pressure.

In the control linkage which generally connects the accelerator with the device for controlling the power of the drive engine, a lost travel or idle path exists to permit the delivery of power only when the lowest gear has been engaged.

Such a control linkage is advantageous since, with a vehicle at standstill and the drive engine running, wherein a forward gear range of the transmission is preselected, a creeping of the vehicle caused by the torque converter usually connected between the drive engine and the change-speed transmission is substantially mitigated if the change-speed transmission is not placed into the lowest gear but rather into the adjacent higher, but wherein the starting can take place in the lowest gear.

The above-described conventional control arrangement is especially suitable for change-speed transmissions connected to an engine wherein the fuel is supplied by way of a carburetor since with such engines there is customarily provided a control pressure linkage adapted to act on the regulating slide valve for the control pressure in dependence upon the positions of the accelerator.

The air underlying the present invention essentially resides in constructing a control arrangement of the aforementioned type for use in change-speed transmissions connected to diesel engines wherein there is generally no control pressure linkage present.

In accordance with the advantageous features of the invention, a downshift control member is provided which affects the vacuum pressure to be brought to bear on the modulating pressure control slide valve.

Advantageously, in accordance with further features of the present invention, a three/two-way valve, operable by the control linkage, is inserted in a vacuum pressure line connecting the pressure regulating valve with the modulating pressure control slide valve in such a manner that the modulating pressure control slide valve in the one position of the three/two-way valve is connected to the pressure regulating valve; however, in the other position, it is connected to the vacuum pressure source supplying the pressure regulating valve.

Advantageously, the three/two-way valve is arranged at a bracket or bearing means for the articulation of a control arm inserted in the control linkage. The control arm may be provided with a cam section for operating the three/two-way valve.

In accordance with further features of the present invention, the downshift control member is in the form of a drag lever-like adjusting gear inserted between the gas pedal and the device for the power control of the driving engine in such a way that an adjusting lever, i.e., an entrainment lever, which is in motion-dependent adjusting gear connection with the accelerator as well as with the adjusting member of the pressure regulating valve, has an idle path with respect to an adjusting lever for adjusting the power of the driving engine. During an operation of the accelerator by way of the control linkage from the idling position, the downshift control member initially sets the pressure regulating valve at a vacuum pressure value corresponding to the modulating control pressure bringing the gear-holding slide valve into a position for the lowest gear before the power adjusting setting lever passes into the adjusting drive connection or engagement position with the adjusting or entrainment lever connected to the gas pedal.

Accordingly, it is an object of the present invention to provide a control arrangement for change-speed transmissions which avoids, by simple means, shortcomings and disadvantages encountered in the prior art.

Another object of the present invention resides in providing a control arrangement for change-speed transmissions which enables the change-speed transmission to be utilized with a diesel engine.

A further object of the present invention resides in providing a control arrangement for change-speed transmissions which functions reliably under all operating conditions.

A still further object of the present invention resides in providing a control arrangement for change-speed transmissions which is simple in construction and therefore relatively inexpensive to manufacture.

These and other objects, features, and advantages of the present invention will become more apparent from the following description when taken in connection with the accompanying drawings which show, for the purposes of illustration only, several embodiments in accordance with the present invention, and wherein.

Figure 1:
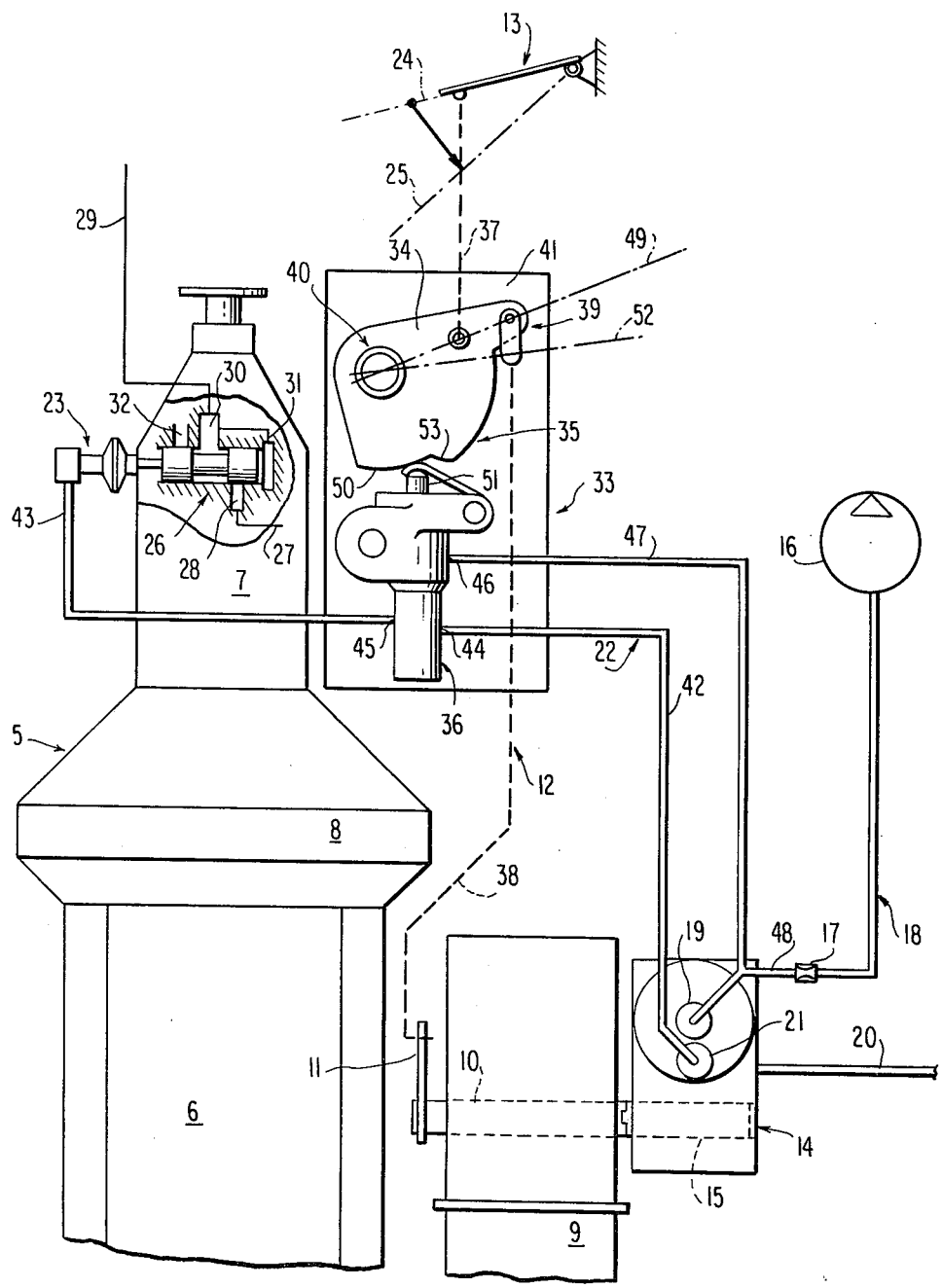
FIG. 1 is a schematic view of a control arrangement for an automatic change-speed transmission in accordance with a first embodiment of the present invention.

Referring now to the drawings wherein like reference numerals are used throughout the various views to designate like parts and, more particularly, to FIG. 1, according to this figure, a drive unit generally designated by the reference numeral 5 includes a diesel engine 6, an automatic change-speed transmission 7, and a hydrodynamic torque converter 8 interposed between the diesel engine 6 and change-speed transmission 7. The diesel engine 6 is provided with an injection pump 9, which an injection quantity of the injection pump 9 being adjusted, in a conventional manner, by a regulating shaft 10 and regulating lever 11. The regulating lever 11 is operated through a control linkage generally designated by the reference numeral 12 by an accelerator or gas pedal generally designated by the reference numeral 13.

A pressure regulating valve generally designated by the reference numeral 14 is flanged or affixed to the injection pump 9, with an adjusting shaft of the pressure regulating valve 14 being coupled with the regulating shaft 10. A vacuum pump 16 is connected through a vacuum feed line 18, containing a throttle 17, to a vacuum feed connection 19 of the pressure regulating valve 14. The pressure regulating valve 14 is provided with an atmospheric connection 20 and a vacuum control connection 21 in communication, through a vacuum control line generally designated by the reference numeral 22, with a vacuum pressure cell generally designated by the reference numeral 23 at the change-speed transmission 7.

The pressure regulating valve 14 operates in a conventional manner described more fully in, for example, German Offenlengungsschrift 22 61 759. More particularly, the pressure regulating valve 14 operates in dependence upon a position of the accelerator 13 which is operable between the illustrated idling position 24 and the full load position 25 in such a manner that the pressure regulating valve 14 sets at its control connection 21 for each position of the gas pedal 13 an analogous vacuum pressure which is the highest in the idling position 24 and lowest in the full load position 25.

The vacuum pressure is converted in the vacuum pressure cell through a diaphram into a control pressure force acting, together with a control spring, on a modulating pressure control slide valve generally designated by the reference numeral 26 provided in the change-speed transmission 7. The modulating pressure control slide valve 26 is provided with a feed connection 28 in communication with an operating pressure line 27, a control connection 30, in communication with a modulating pressure control line 29, a reaction connection 31, in communication with the line 29, as well as a zero connection 32. The modulating pressure control slide valve 26 cooperates with the diaphragm of the vacuum pressure cell 23 so that the modulating pressure derived from the operating pressure of the operating pressure line 27 and present in the modulating pressure control line 29 varies analogously to the positions of the accelerator 13 and is the lowest if the accelerator 13 is in the idle position 24, but assumes its highest value if the accelerator 13 is in the full load position 25.

A downshift control element generally designated by the reference numeral 33 is interposed in the vacuum pressure control line 22. The downshift control element 33 includes a control arm 34 inserted in the control linkage 12 and having a cam section generally designated by the reference numeral 35 and a three/two-way valve generally designated by the reference numeral 36 operable by the cam section 35. While a portion 37 of the control linkage 12 connected to the accelerator 13 is in fixed, motion-dependent connection with the control arm 34, an idle path 39 is interposed between the section 38 and the control linkage 12, connected to the regulating lever 11, and the control arm 34 in order to ensure a leading of the downshifting into the lowest gear with respect to the responding of the regulating shaft 10 during operation of the accelerator 13 from the idling position 24.

The control 34 with its pivot bearing generally designated by the reference numeral 40, as well as the three/two-way valve 36 are arranged on a bracket or bearing 41 founted to the drive unit 5, preferably to the engine 6. The three/two-way valve 36 subdivides the vacuum pressure control line 22 into line section 42, 43 and includes valve connections 44, 45, and 46. While the two valve connections 44, 45 are connected to a respective line section 42, 43 of the vacuum pressure control line 22, the third valve connection 46 is connected through a branch line 47 to a line section 48 of the vacuum pressure feed line 18 placing the throttle 17 in communication with the vacuum pressure feed connection 19 of the pressure regulating valve 14.

In the illustrated position designated 49 of the control arm 34, a portion 50 of the cam section 35 is in engagement with the valve setting member 51 of the three/two-way valve 36. Thereby the three/two-way valve 36 is in its position for a higher gear when its valve connections 45 and 46 are connected with each other and its valve connection 44 is blocked. As a result, the higher vacuum pressure value of the branch line 47 is brought to bear on the modulating pressure control slide valve 26, so as to provide a lower modulating pressure in the modulating pressure control line 29.

When the control arm 34 is operated so as to be displaced into the engagement position designated 52 with the section 38 of the control linkage 12, the valve adjusting member 51 is brought, by a second portion 53 of the cam section 35, into the position for the lowest gear wherein the valve connections 44 and 45 are joined together or brought into communication and the valve connection 46 is blocked whereby the lower vacuum pressure set by the pressure regulating valve 14 at its valve connection 21 is brought to bear on the modulating pressure control slide valve 26 so that a higher modulating pressure results in the modulating pressure control line 29.

Figure 2:
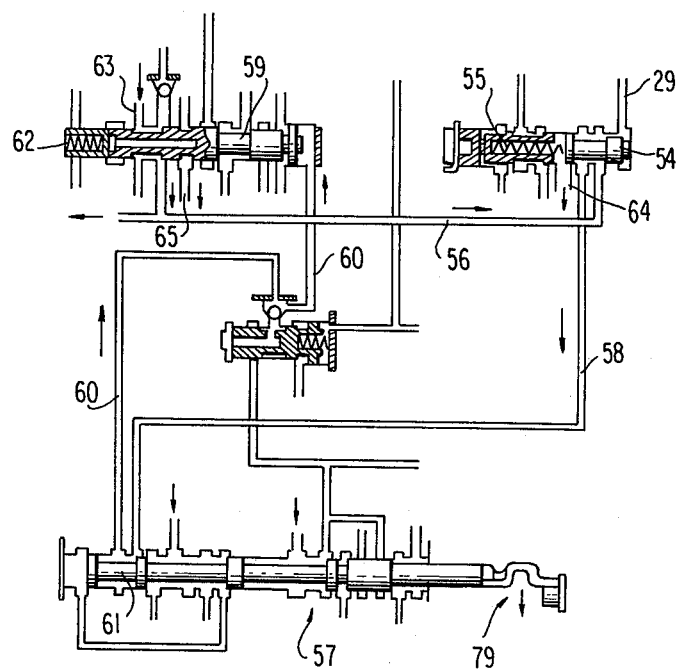
FIG. 2 is a schematic shifting diagram applicable to both embodiments of the control arrangement of the present invention for a gearshifting between the lowest gear and the adjacent higher gear.

The modulating pressure control line 29, as shown in FIG. 2, leads to one end face of a gear-holding control slide valve generally designated by the reference numeral 54 which is brought into the illustrated position for the higher gear by a spring 55 acting on the other end face of the valve since in the modulating pressure control line 29, the lower modulating pressure associated with the idling position 24 of the accelerator 13 has been set by the three/two-way valve 36. In this position, the gear-holding control slide valve 54 connects an operating pressure line 56 leading to the shifting servo element of the higher gear to a control pressure line 58 leading to a range selection control slide valve generally designated by the reference number 57.

The range selection control slide valve 57 is in a position wherein all forward gears are shifted and the control pressure 58 is connected to a control pressure line 60 leading to the one end face of a gearshift control slide valve generally designated by the reference numeral 59 by way of a control slide section 61 of the range selection control slide valve 57. Thus, the pressure of the operating pressure line 56 is applied to the gearshift control slide valve 59 which thereby is brought, against the action of a spring 62 acting on its other end face, into the illustrated position for the higher gear wherein it connects the operating pressure line 56 to an operating pressure line 63.

During a startup of the drive unit, the portion 53 (FIG. 1) of the cam section 35 shifts the three/two-way valve 36 in a manner described more fully hereinabove, whereby the higher modulating pressure is set in the modulating pressure control line 29 bringing the gear-holding control slide valve 54 into its left-hand position for the lowest gear wherein it blocks the operating pressure line 56 and connects the control pressure lines 58, 60 to a zero connection 64. In this state, the pressure is turned off on the right-hand end face of the gearshift control slide valve 59 and the gearshift control slide valve 59 is brought into its right-hand position for the lowest gear by virtue of the action of the spring 62. In this position, the operating pressure line 63 is blocked off and the operating pressure line 56 is connected to a zero connection 65, whereby the shifting servo element of the higher gear is turned off.

The control arrangement of FIGS. 3 and 4 coincides with the embodiment of FIG. 1 at least in the following respects. The pressure regulating valve 14 is flanged or connected to the injection pump 9 feeding the diesel engine 6 of the drive unit 5. The pressure regulating valve 14 is provided with connections 19, 20 and 21 with the connection 19 being in communication with a vacuum pump 16 through a vacuum pressure supply line 18 containing a throttle 17. While the connection 20 is in communication with the atmosphere, the connection 21 is in communication, through a vacuum pressure control line 22, with the vacuum pressure cell 23 acting through a diaphragm on the modulating pressure control slide valve 26. The modulating pressure control slide valve 26 sets a modulating pressure in the modulating pressure control line 29, which pressure is made effective on the gear-holding control slide valve 54 (FIG. 2).

Figure 3:
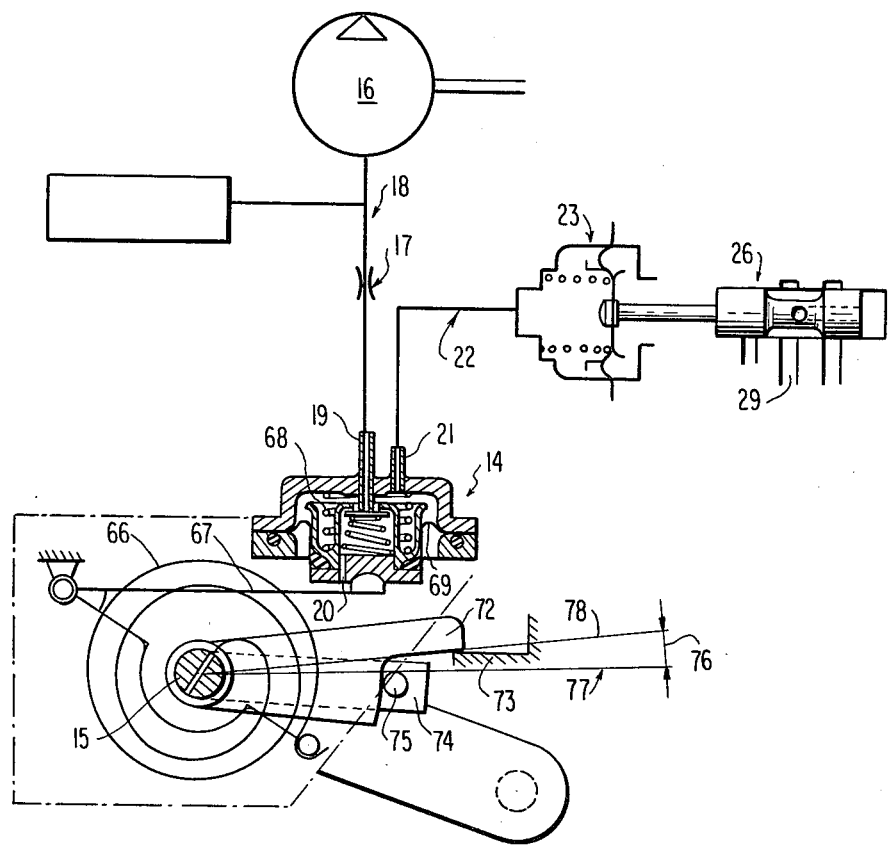
FIG. 3 is a schematic illustration of the control arrangement in accordance with a second embodiment of the present invention.
Figure 4:
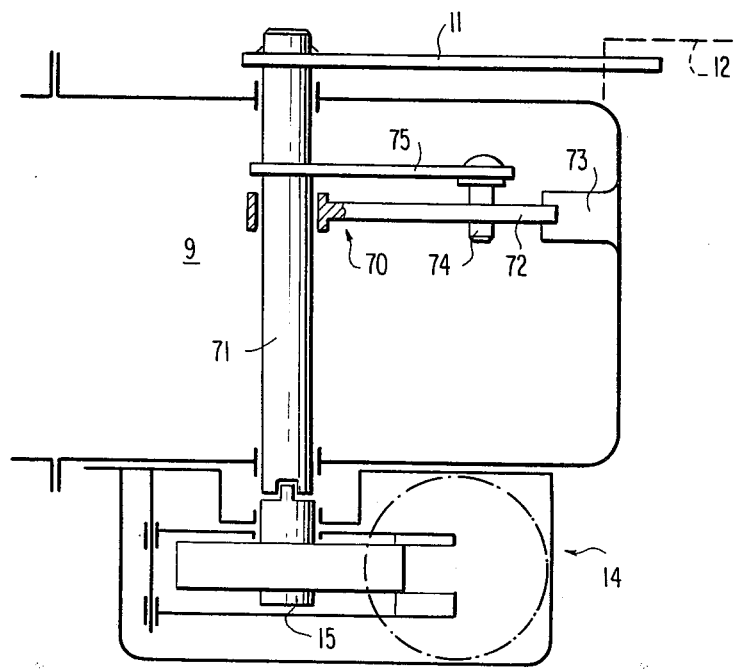
FIG. 4 is a schematic top view of a drag lever gear of FIG. 3 operating as a downshift control member.

The gas pedal or accelerator, not illustrated in FIGS. 3 and 4, operates the regulating lever 11 through the control linkage 12 which, in the embodiments of FIGS. 3 and 4, is not kinematically interrupted. The regulating lever 11 operates the adjusting shaft 15 of the pressure regulating valve 14 acting through a coil spring 66 on an angular lever 67 which makes the spring force dependent upon the gas pedal effective on the diaphragm 69 of the pressure regulating valve 14, which diaphragm is under the countereffect of a further spring 68.

The embodiment of the control arrangement of FIGS. 3 and 4 differs from the embodiment of FIG. 1 in that a drag lever 70, fashioned as a downshift control member, is inserted between the regulating lever 11 and the adjusting member of the injection pump 9. The drag lever includes an adjusting shaft 71 coupled with the adjusting shaft 15 of the pressure regulating valve 14 and a loose lever 72 which is pivotably mounted on the adjusting shaft 71. The loose lever 72, which actuates the adjusting member setting the injection quantity of the injection pump 9, is held in the illustrated idling position of the control linkage 12 or accelerator by a spring force in contact with an idling stop 73 and has an idle path 76 with respect to a dog 74 of an entraining lever 75 fixed to the adjusting shaft 71 for rotation therewith.

During an operation of the control linkage 12 by a displacement of the accelerator from the idling position designated 77 in FIG. 3 for the dog 74, the pressure regulating valve 14 is simultaneously operated by the adjusting shaft 71 into a position for a lower vacuum pressure in the vacuum pressure control line 22, with the loose lever 72 still remaining in contact with the idling stop 73 due to the idle path 76. By this corresponding reduction in the vacuum pressure, the vacuum pressure cell 23 and/or the spring cooperating therewith bring the modulating pressure control slide valve 26 into a position for a higher modulating pressure in the modulating pressure line 29 whereby the gear-holding control slide 54 (FIG. 2) triggers the shifting into the lowest gear, as described hereinabove in connection with FIGS. 1 and 2. After a shifting has been accomplished, the dog 74 enters into an engagement position designated 78 with the loose lever 72 so that the accelerator is kinematically coupled through the control linkage 12 to the loose lever 72 and thus to the servo or control member adjusting the injection quantity of the injection pump 9.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A control mechanism for an automatic gear shift connected to a driving engine, comprising:

shifting control valve means for gear shifting from a lowest to a higher gear;

manually operable range-selection control valve means and gear-holding valve means responsive to modulating control pressure interconnected with one another in such a way that the shifting control valve means is held in a position engaging a higher gear when the driving engine is idling and the range-selection control valve means is in a position actuating a forward-gear range;

a movable driving pedal connected with a control element of a power control of the driving engine by a control linkage having a free-travel connection;

a back-shift control member operable by the driving pedal for influencing the modulating control pressure in such a way that, when the driving pedal is moved from an idling position and is in the free-travel of the free-travel connection, the control element remains in its idling position while the gear-holding valve means and the shifting control valve means are moved to positions engaging the lowest gear; the driving pedal, beyond the free-travel of the free-travel connection, being kinematically connected with the control element, wherein when modulating control pressure is operable by a vacuum responsive modulating pressure control valve means adjustable to be dependent on torque of the driving engine, the gear-holding control valve has a constant modulating pressure connection to the modulating pressure control valve means;

a pressure-regulating valve for adjusting vacuum at the modulating pressure control valve means as a function of a position of the control element, wherein the back-shift control member is connected with the pressure-regulating valve in such a way that, when the driving pedal is in an idling position, vacuum at the modulating pressure control valve means is adjusted to a pressure value that corresponds to a pressure value of the modulating control pressure, whereby when the gear-holding valve means is held in a position for a higher gear, and, when the driving pedal moves from the idling position into the free-travel of the free-travel connection, the vacuum is brought to a pressure value that corresponds to a pressure value of the modulating control pressure when the gear-holding valve means is in the position for engaging the lowest gear.

2. The control mechanism according to claim 1, wherein a 3/2-way valve that can be operated by the driving pedal, is connected in a vacuum line connecting the pressure-regulating valve with the modulating pressure control valve means in such a way that the modulating pressure control valve means in one position of the 3/2-way valve is connected with the pressure-regulating valve, but in the other position is connected with a vacuum source feeding the pressure-regulating valve.

3. The control mechanism according to claim 1, wherein the 3/2-way valve is disposed at a bearing for the pivoting of a guide means connected in the control linkage.

4. The control mechanism according to claim 1, wherein a guide means is provided with a cam for the operation of a 3/2-way valve.

5. The control mechanism according to claim 1, wherein a guide means by means of the free-travel connection is connected with a rod means connected with the control element of the power control.

6. The control mechanism according to claim 1, wherein the backshift control member includes a spring acting upon a control element of the pressure-regulating valve and a part of the free-travel connection that adjusts the tension of said spring, the spring being kinematically connected with the driving pedal, and the spring tension in the idling position of the driving pedal has a tension value that corresponds to the pressure value of the vacuum necessary for engaging the higher gear, and a tension value that goes to a value corresponding to the pressure value of the vacuum for engaging the lowest gear.

* * * * *